Aug. 9, 1932.   A. M. HAGEMAN ET AL   1,871,367
METHOD OF COATING HOLLOW BODIES
Original Filed Jan. 27, 1925
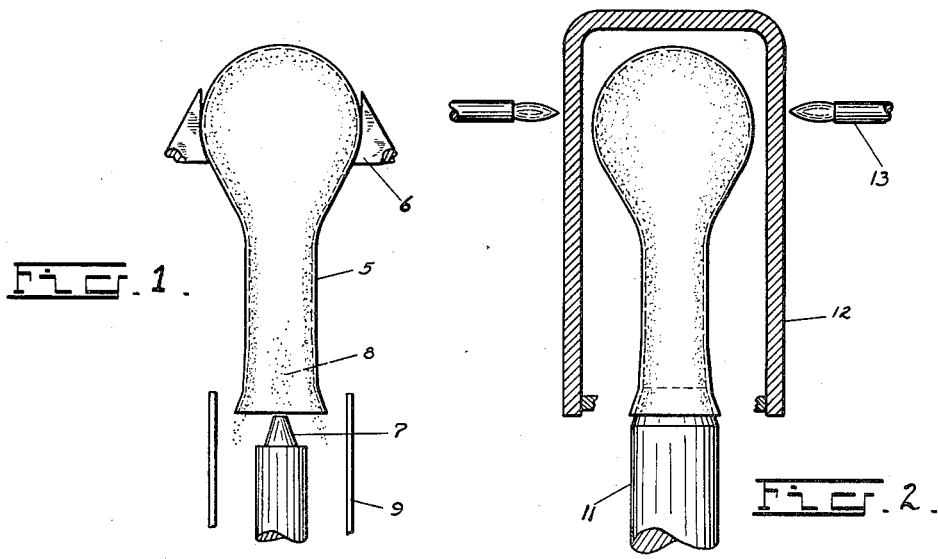
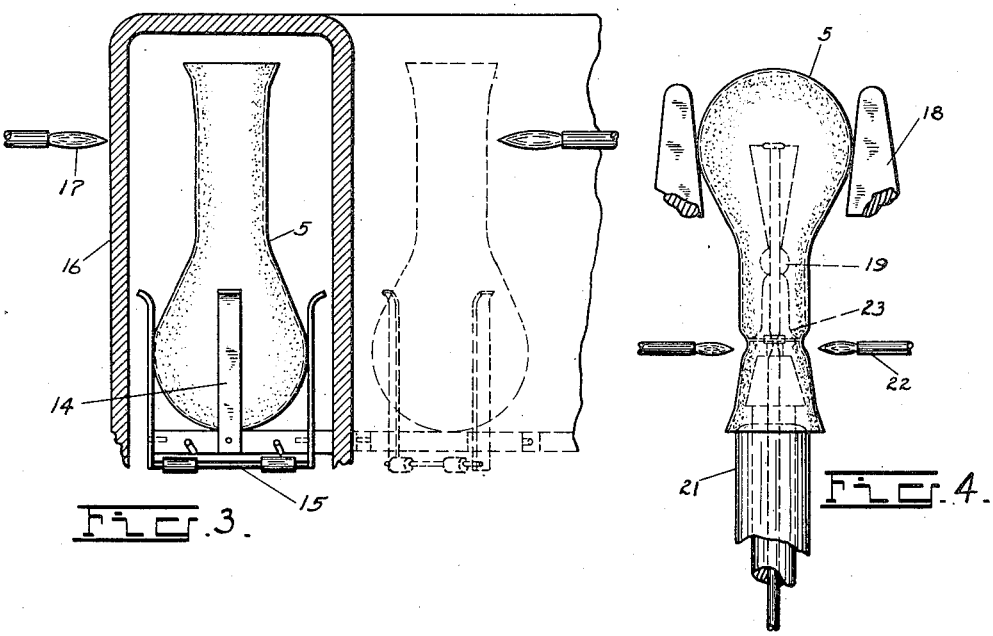
INVENTOR
A. M. HAGEMAN
BY A. F. LINDSTROM
ATTORNEY Patented Aug. 9, 1932

1,871,367

UNITED STATES PATENT OFFICE

AARON MARTIN HAGEMAN, OF BLOOMFIELD, AND ALBERT FERDINAND LINDSTROM, OF NUTLEY, NEW JERSEY, ASSIGNORS TO WESTINGHOUSE LAMP COMPANY, A CORPORATION OF PENNSYLVANIA

METHOD OF COATING HOLLOW BODIES

Original application filed January 27, 1925, Serial No. 5,080. Divided and this application filed July 29, 1929. Serial No. 381,790.

This invention relates to coated articles such as incandescent electric lamp bulbs and the like, and is a division of our copending application Serial No. 5,080 filed January 27, 1925, covering method of coating vitreous articles and articles produced thereby.

In the manufacture of incandescent electric lamps opalescent effects have heretofore been produced by using opal glass, that is, a glass to which cryolite is added during the manufacture thereof. Such a glass is expensive and moreover, with extensive use of the lamps, the glass tends to decompose with a liberation of gases probably silicon fluoride ($SiF_4$) which are injurious to the lamp and shorten the life thereof. Furthermore, the light absorption of opal glass is extremely high and is not uniform due to the uneven thickness of the bulb. This results in the light emitted from the lamp being of low and unequal intensity.

It has also been proposed to produce opalescent effects by etching the glass with hydrofluoric acid or other etching solutions. Extreme care must be taken, however, in the handling of such materials and their use is therefore extremely objectionable. Moreover, the effects produced are not lustrous nor of a pearly character.

In application, Serial No. 737,609, filed September 13, 1924, entitled Coated article and method of making the same, in the names of A. M. Hageman and A. F. Lindstrom, there is described a method of applying a coating to a glass object to produce opalescent lustrous effects. While such method is of great practical advantage and has given satisfactory results, it has been found that production is expedited and even more satisfactory results are attainable when practicing the present improved steps in the method.

One of the objects of the present invention is to produce a hollow glass or vitreous article having an opal or colored lustrous appearance and a smooth exterior surface in a more expeditious manner.

Another object of the invention is to produce an incandescent electric lamp bulb having an internal superficial light diffusing coating which will cooperate with other operations in faciliitating the manufacture of an incandescent electric lamp.

Another object of the invention is to provide a method for expediting coating of an incandescent lamp bulb on the interior surface with a material capable of producing light diffusing opalescent or colored effects.

Other objects and advantages will be apparent from the following description.

In accordance with this invention, a coating composition or enamel is applied to the interior surface of a hollow glass article, such as an incandescent lamp. The coating composition may comprise a pigment, a binder, a filler, an ingredient which may cause the composition to assume a more even coating and to aid in reducing the melting point of the composition to which the article is applied and another ingredient for materially reducing the melting point of a vitreous object when the coating is applied thereto.

The binder may be of such a nature that it will aid in producing opalescent effects when dehydrated, although colored effects may be had by the addition of a separate pigment to the composition.

The pigment may be more or less opaque in order to render the surface to which it is applied, light diffusing, and to produce an opalescent or pearly effect; the filler may be composed of a more or less translucent material so as not to interfere with the passage of light to any appreciable degree; the binder may be of such a character as to be suitable for uniting the pigment and filler together and to the object to which the enamel may be applied.

The ingredients should be stable or capable of combining to form compounds which are stable at the operating temperature of the lamp. Furthermore, they must be capable of withstanding the heat to which the glass is subjected during the sealing-in operation of the bulb to a mount.

It will be understood that heretofore in coating electric lamp bulbs, the coating was applied after the lamp was finished; that is, after the mount or interior structure had been sealed by fusion to the bulb. This operation of sealing is important in the lamp industry and consists in supporting the so-called mount; that is, the glass portion which carries the filament, and positioning the bulb over the mount so that the interior of the neck part of the bulb is adjacent to the periphery of a flange on the mount. Gas flames are then directed to the outer portion of the bulb to locally heat the same until plastic for consolidation with the flange of the mount. The bulb is then exhausted and the screw base is subsequently applied to complete the lamp.

It will be readily appreciated that in the manufacture of large quantities of lamps, any interference to the efficient and practical union of the bulb and mount would be decided disadvantage and tend to reduce production or increase cost.

It is, therefore, desirable when interiorly coating lamp bulbs, to produce a composition which will not only perform the function of producing an opalescent or desirable light diffusing bulb but which will cooperate with the manufacturing operations and facilitate the operation of sealing the bulb to the mount or at least neutralize any inherent tendencies of a coating to raise the melting point of the glass.

The composition, when applied to the lamp or other object, must quickly reach a smooth even condition of sufficient thickness and opacity to give a pearly white appearance for a lustrous color effect with a minimum obstruction of light. As above stated, it is further desirable that the coating or enamel be of such composition that it will not substantially effect the melting point of the glass to interfere with the sealing-in operation when the coating is applied to an incandescent electric lamp bulb.

The present coating, therefore, includes ingredients which tend to facilitate this sealing-in operation by lowering the melting point of the glass, thus aiding in the production of a complete lamp. It is desirable that the solid ingredients of the composition be in a finely divided form to obtain an intimate mixture to produce a smooth and even coating. The filler for giving a light diffusing effect should be white and more or less transparent and the specific gravity of the binder may be relatively low and the required consistency of the mixture may be secured with the proper amount of filler. The coating should have the property of setting upon the application of heat into a compact and homogeneous mass, containing non-volatile constituents.

The mode of application of the coating to a lamp bulb and the operation of sealing the bulb to the mount will be more fully understood by reference to the accompanying drawing, in which Fig. 1 is a side view of a bulb positioned to be flushed with the coating composition;

Fig. 2 shows a bulb within a heat chamber of relatively high intensity;

Fig. 3 shows a conveyor for carrying bulbs through an oven and several bulbs in position, and Fig. 4 shows a bulb positioned for sealing-in operation to unite the bulb to a mount.

The present method may be carried out in the following manner, an understanding of which will more readily be had by reference to the accompanying drawing.

A bulb 5 may be supported in a suitable holder 6 and positioned over a nozzle 7 connected to a supply line or tank for directing a stream or spray of coating composition 8 over the interior of the bulb, the excess composition being confined from promiscuous dispersion by a baffle 9.

After the lamp has been coated, it may be placed on a holder 11 and inserted into an oven 12 heated by suitable fires 13. The oven 12 may have a relatively high temperature of from 650° to 700° C. as above set forth. When a bulb has been applied to the oven 12 for a relatively short time interval, it is inverted and positioned in a rack 14 of a conveyor 15, which conveyor is arranged to travel through an oven 16 heated by suitable fires 17. This oven may attain a temperature of from 200 to 450° C., as above set forth. Upon being discharged from the baking oven 16, a bulb may be positioned in a bulb support 18 and over a lamp mount 19 disposed in a mount holder 21. Suitable fires 22 may be employed to fuse the neck of the bulb to the lower flared portion 23 of the lamp mount, at which time the flux in the coating serves to reduce the melting point of the glass and facilitate this operation.

A composition which has been found to meet all the requirements for a coating of the above character may include the following ingredients and proportions, although variations may be made therein without departing from the invention.

We may employ 100 grams of kaolin, China clay or other filler, such for example as aluminum silicate, flint, silica or the like. When using kaolin, a very pure fine grade of white kaolin is mixed with 15 grams of an alkali, such as sodium hydroxide, or other medium for rendering the coating mobile or freely flowing, 50 grams of zinc phosphate or other low melting point flux and 1000 c.c. of a binder composed of an equeous solution of an alkali silicate, preferably sodium silicate having a specific gravity of 1.025. The aluminum silicate or filler gives a body to the composition to give it the right consistency for application to the objects to be coated. The alkali renders the enamel more mobile without substantially altering its density, causing it to assume a smooth even coating and it also serves to aid in reducing the fusing temperature of a vitreous object to which the composition may be applied. The zinc phosphate serves to overcome the tendency of the other ingredients to increase the melting point of a vitreous article to which the coating may be applied and reduces the fusing temperature of the article.

Although it has been found that a pigment may be attained by dehydrating the sodium silicate or binder, it is found possible and more desirable to reduce the amount of sodium silicate as well as to reduce the amount of the filler by the addition of the zinc phosphate which functions as a pigment and at the same time gives a coating which will absorb less light but which will properly diffuse the light to avoid the undesirable glare of a filament. The above compositions are more fully set forth in our Patent 1,752,792 of April 1, 1930 for composition for coating vitreous articles.

When desirable, we may use our coating without a binder, in which case the aluminum silicate and a suitable vehicle, as water, may be employed. The flux such as zinc phosphate may be used with the filler and a peptizing agent is also desirable.

In compounding the present ingredients, a mixture thereof is placed in a mixing vessel or ball mill and thoroughly agitated until a homogeneous mixture is attained. By reason of the constituents of the mixture and the relative proportions thereof, a freely flowing fluid is produced, which may be applied to objects by pouring over the same or being sprayed thereon and allowing the excess material to drain therefrom by gravity.

If desired, the bulb or other object when coated upon the inside may be agitated or its interior subjected to a vacuum to assist in removing any excess coating. This, however, has not been found necessary with the present coating which is drained by gravity, leaving a smooth layer in a very short time interval.

Previously when an article or vessel has been coated, in accordance with our method, the coated article was subjected to a heat-treatment at an elevated temperature of from 200 to 450° C. for three or four minutes to dehydrate the binder and bake the coating, thus causing it to become firmly united to the object. The heat also removed all the occluded gases which may be contained in the coating and reduces the sodium silicate to a fine white crystalline form.

We have found that the method is expedited and better results are obtained by coating the interior of a vessel, as for example, an electric incandescent lamp bulb and then suddenly arresting the flow of the coating upon the surface of the bulb.

The flow of coating is thereby checked after the coating has assumed a smooth, uniform, even layer and is ready to be placed in the baking oven without danger of subsequent movement of the coating upon the bulb which may tend to mar the surface of the coating or destroy its uniformity.

For the purpose of effecting this checking operation, we provide a temporary preheater in which the bulb, having a moist coating thereon, is thrust and subjected to a relatively high temperature of say 650 to 700° C. The time interval during which the coated bulb is subjected to this high temperature may be relatively brief, fifteen seconds having been found sufficient. The fact that inasmuch as this temperature is very near the melting point of glass, it is merely necessary to maintain the article in this heat zone until the coating has become partially hardened or the outer surface thereof has hardened, confining the remaining portion of the coating from movement. This operation is more in the nature of a flash-heat to prepare the bulbs for application to the baking oven. The bulbs after being subjected to the flash bake, may be positioned in the baking oven without danger of streaks occurring from a flow of material before the same has set and the desirable slow baking-out process may be thus attained. The second baking temperature may be the same as previously found desirable, that is, about 200 to 450° C.

It has been found that, ordinarily, when baking out the bulbs, it is necessary to place the same in the baking oven with their open ends downwardly to avoid any accumulation of the coating at the top portion of the bulb.

This positioning of the bulbs during baking is not desirable, inasmuch as the moisture which is released from the coating rises in the form of steam at the top of the bulb and cannot readily escape, when the bulbs are removed the moisture condenses, thus making it either necessary to heat and drive the same out or undergo certain disadvantages during the sealing operation.

By the present preheating to set the coating, bulbs may be positioned with the open end up and during the baking, any gases may readily escape. This method of baking bulbs is a great advantage in practical operation, since it results in the rapid coating of lamps without the uncertainty of their becoming streaked during the baking operation, thus promoting efficiency in production by reducing loss through defects which might occur in the product.

The method as practiced includes the flushing of the interior of a lamp bulb or other vessel by a stream of the present coating composition. The bulb or vessel with the coating thus applied is quickly introduced into a heat zone of relatively high temperature which acts to stop the coating from draining, resulting in a uniform layer without streak marks. The bulb with the coating initially set is then placed with the open end disposed upwardly upon a suitable conveyor and carried through a baking oven of a temperature sufficient to finally bake out the coating and prepare the vessel as in the case of a bulb for sealing to a lamp mount, the sealing operation being performed in the usual manner but aided by reason of certain ingredients of the coating composition.

It is, of course, to be understood that the preesnt invention is not limited to the coating of incandescent electric lamp bulbs, nor to the exact method and ingredients and proportions as set forth herein and that many modifications may be made therein which lie within the spirit of the invention as set forth in the appended claims.

What is claimed is:

1. The method of producing incandescent electric lamps consisting in coating the interior of a lamp bulb with a light diffusing medium, initially heating to partially dehydrate and prevent further flow of such coating and subsequently baking to fully dehydrate the coating.

2. The method of coating a hollow article consisting of introducing a quantity of coating composition into the interior of an article, permitting the composition to flow to assume an even coating therein, heating to arrest the flow of said material and subsequently baking the material to dehydrate said coating.

3. The method of coating a hollow article consisting in introducing a quantity of coating composition into the interior of said article, permitting the composition to flow and to assume a smooth, even coating, removing excess composition, heating to arrest further flow of the composition and baking to dehydrate.

4. The method of coating a hollow article, consisting in introducing therein, a quantity of coating composition, permitting the composition to flow and assume a uniform smooth coating upon the inner surface of said article, elevating the temperature of the article to quicklyl check further flow of said composition and subjecting the article to a lower temperature for a baking operation.

5. The method of coating an incandescent electric lamp bulb which comprises introducing a quantity of coating composition into said bulb, permitting said composition to assume a smooth even coating upon the wall of the bulb, subjecting the bulb to a relatively high heat-treatment to arrest the flow of the coating, positioning the bulb in an oven for a heat-treatment at a lower temperature to dehydrate the coating and so disposing the bulb as to permit the natural outlet of gases from the bulb during such treatment.

6. The method of coating an incandescent electric lamp bulb which comprises flushing the bulb with a coating composition, permitting the composition to flow upon a wall of the bulb and assume a smooth layer thereon, removing excess composition from said bulb, checking the flow of the said composition over the surface by elevating the temperature of said composition, positioning the bulb with the open end disposed upwardly and baking at a lower temperature.

In testimony whereof, we have hereunto subscribed our names this 26th day of July, 1929.

AARON MARTIN HAGEMAN.
ALBERT FERDINAND LINDSTROM.